United States Patent [19]

Lippmeier

[11] Patent Number: 5,076,496
[45] Date of Patent: Dec. 31, 1991

[54] EXHAUST NOZZLE FLAP SEAL

[75] Inventor: William C. Lippmeier, Cincinnati, Ohio

[73] Assignee: General Electric Company, Cincinnati, Ohio

[21] Appl. No.: 475,465

[22] Filed: Feb. 5, 1990

[51] Int. Cl.⁵ .............................................. B64C 9/38
[52] U.S. Cl. ........................... 239/265.41; 239/265.33; 239/397.5
[58] Field of Search .................. 239/265.33, 265.35, 239/265.37, 265.39, 265.43, 397.5, 455; 60/242, 271, 39.32

[56] References Cited

U.S. PATENT DOCUMENTS

| | | | |
|---|---|---|---|
| 3,972,475 | 8/1976 | Nelson et al. | 60/271 |
| 4,128,208 | 12/1978 | Ryan et al. | 239/265.39 |
| 4,176,792 | 12/1979 | McCardle | 239/265.41 |
| 4,219,156 | 8/1980 | Schwaerzler | 239/265.35 |
| 4,245,787 | 1/1981 | Freid | 239/265.41 |
| 4,363,445 | 12/1982 | Bouiller et al. | 239/265.35 |
| 4,456,178 | 6/1984 | Jones et al. | 239/265.39 |
| 4,508,270 | 4/1985 | Joubert | 239/265.35 |
| 4,575,006 | 3/1986 | Madden | 239/265.29 |
| 4,637,550 | 1/1987 | Nash | 239/265.37 |
| 4,887,663 | 12/1989 | Auxier et al. | 60/39.32 |
| 4,920,742 | 5/1990 | Nash et al. | 60/39.32 |
| 4,944,151 | 7/1990 | Havnanian | 60/39.32 |

FOREIGN PATENT DOCUMENTS 2230239 10/1990 United Kingdom .

*Primary Examiner*—Andres Kashnikow
*Assistant Examiner*—Christopher G. Trainor
*Attorney, Agent, or Firm*—Jerome C. Squillaro

[57] ABSTRACT

An exhaust nozzle flap seal includes a seal plate, a support member, and structure for joining the support member to the seal plate which is effective for allowing the seal plate to slide relative to the support member for accommodating differential thermal movement therebetween. In a preferred, exemplary embodiment, the exhaust nozzle flap seal is disposed in combination with a vectorable, axisymmetric, variable area exhaust nozzle and is also effective for accommodating twist of the flap seal when the exhaust nozzle is positioned for vectoring thrust.

20 Claims, 6 Drawing Sheets

Fig. 8.
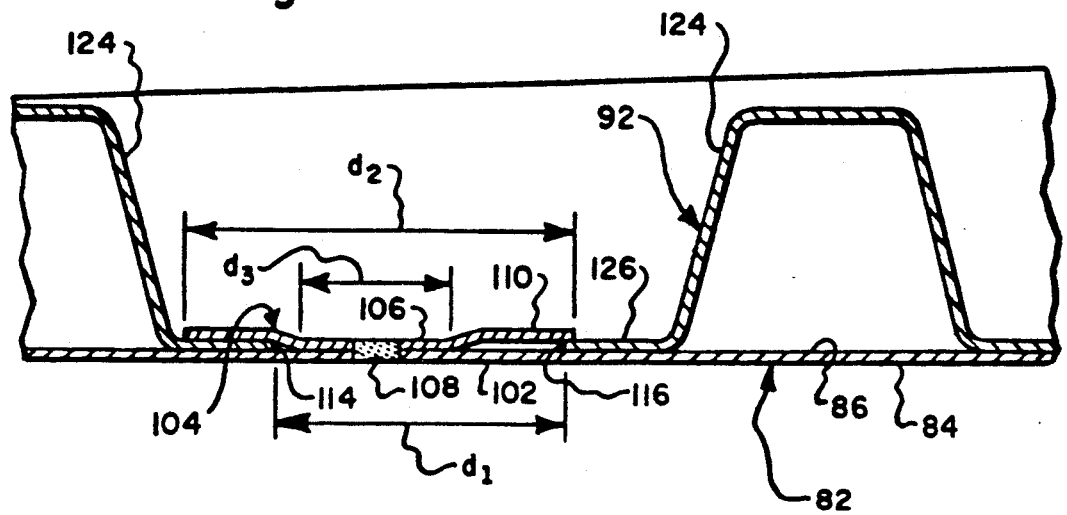
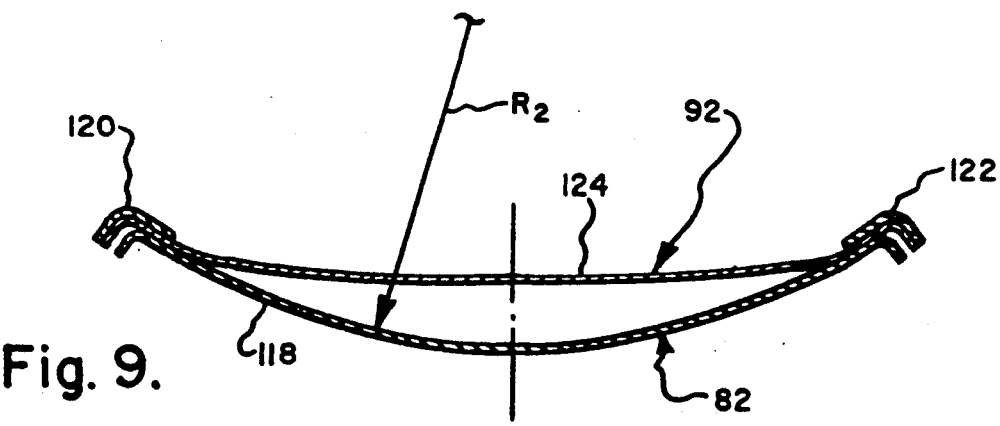
Fig. 9.
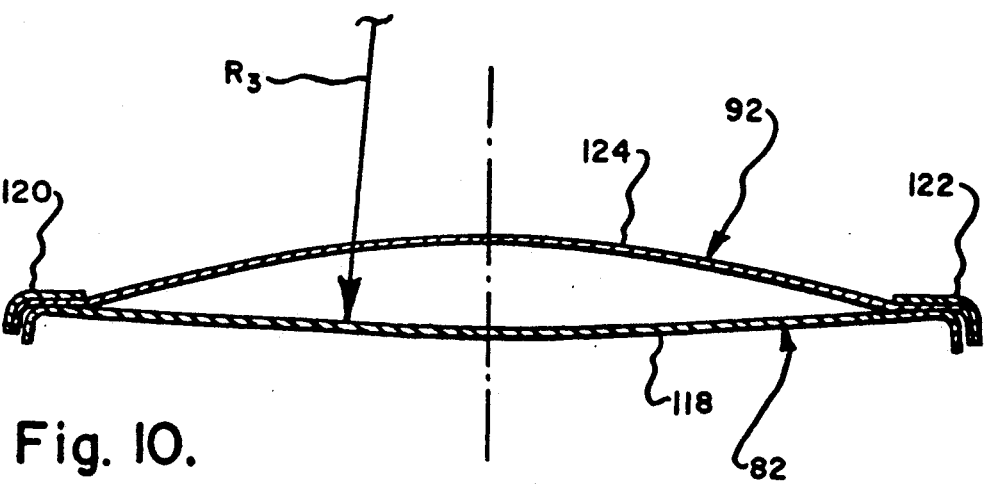
Fig. 10.

EXHAUST NOZZLE FLAP SEAL

BACKGROUND OF THE INVENTION

The present invention relates generally to gas turbine engine exhaust nozzles, and, more particularly, to an exhaust nozzle having an improved exhaust nozzle flap seal.

One type of conventional gas turbine engine exhaust nozzle includes primary and secondary exhaust flaps arranged for defining a variable area converging-diverging exhaust nozzle. The exhaust nozzle is axisymmetric, or annular, and exhaust flow is confined by the primary and secondary flaps being positioned circumferentially adjacent to each other, respectively.

The secondary flaps, for example, have a forward end defining a throat of minimum flow area and an aft end having a larger flow area for defining a diverging nozzle extending downstream from the throat. The secondary flaps are variable, which means that the spacing between the secondary flaps as they are moved from a smaller radius position to a larger radius position must necessarily increase. Accordingly, conventional exhaust nozzle flap seals are suitably secured between adjacent ones of the secondary flaps to confine the exhaust flow and prevent leakage of exhaust flow between the secondary flaps.

In an advanced axisymmetric exhaust nozzle configured for obtaining thrust vectoring, the secondary flaps are positionable not only symmetrically relative to a longitudinal centerline of the exhaust nozzle, but may be positioned asymmetrically relative thereto for obtaining pitch and yaw vectoring. In such a position, adjacent secondary flaps are positioned askew from each other, and therefore the exhaust nozzle flap seal disposed therebetween must be effective for maintaining sealing also as the secondary flaps are positioned for vectoring.

Furthermore, since the exhaust nozzle is channeling relatively hot combustor discharge gases, the exhaust nozzle flap seals must be able to accommodate such relatively hot temperatures and differential movement of structural elements due to differential heating and cooling thereof.

OBJECTS OF THE INVENTION

Accordingly, one object of the present invention is to provide a new and improved exhaust nozzle and flap seal therefor.

Another object of the present invention is to provide a new and improved exhaust nozzle flap seal effective for accommodating differential thermal movements.

Another object of the present invention is to provide an exhaust nozzle flap seal effective for use in a vectorable, axisymmetric, variable area exhaust nozzle.

Another object of the present invention is to provide an exhaust nozzle flap seal effective for accommodating twisting thereof while maintaining sealing contact with adjacent members in an exhaust nozzle.

Another object of the present invention is to provide an exhaust nozzle flap seal which is relatively simple and may be fabricated from stamped sheet metal.

SUMMARY OF THE INVENTION

An exhaust nozzle flap seal includes a seal plate, a support member, and means for joining the support member to the seal plate which is effective for allowing the seal plate to slide relative to the support member for accommodating differential thermal movement therebetween. In a preferred, exemplary embodiment, the exhaust nozzle flap seal is disposed in combination with a vectorable, axisymmetric, variable area exhaust nozzle and is also effective for accommodating twist of the flap seal when the exhaust nozzle is positioned for vectoring thrust.

BRIEF DESCRIPTION OF THE DRAWING

The novel features believed characteristic of the present invention are set forth and differentiated in the claims. The invention, together with further objects and advantages thereof, is more particularly described in conjunction with the accompanying drawing in which:

FIG. 8 is an enlarged sectional view of a portion of the flap seal illustrated in FIG. 7.

FIG. 9 is a transverse sectional view of the flap seal illustrated in FIGS. 6 and 7 taken along line 9—9.

FIG. 10 is a transverse sectional view of the flap seal illustrated in FIGS. 6 and 7 taken along the line 10—10.

DETAILED DESCRIPTION

Figure 1:
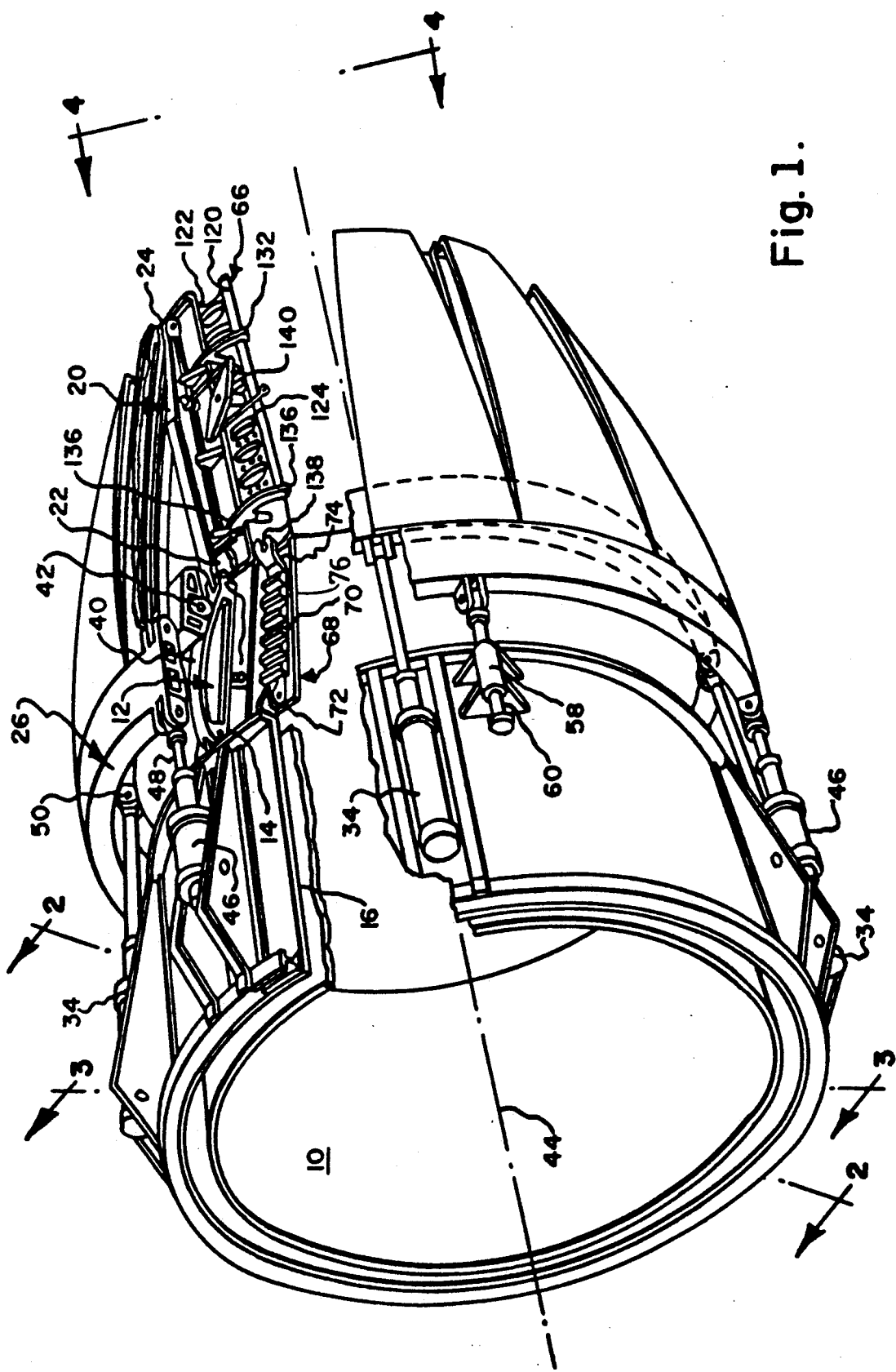
FIG. 1 is a perspective, partly sectional view of a variable area, axisymmetric, vectorable exhaust nozzle for a gas turbine engine.
Figure 2:
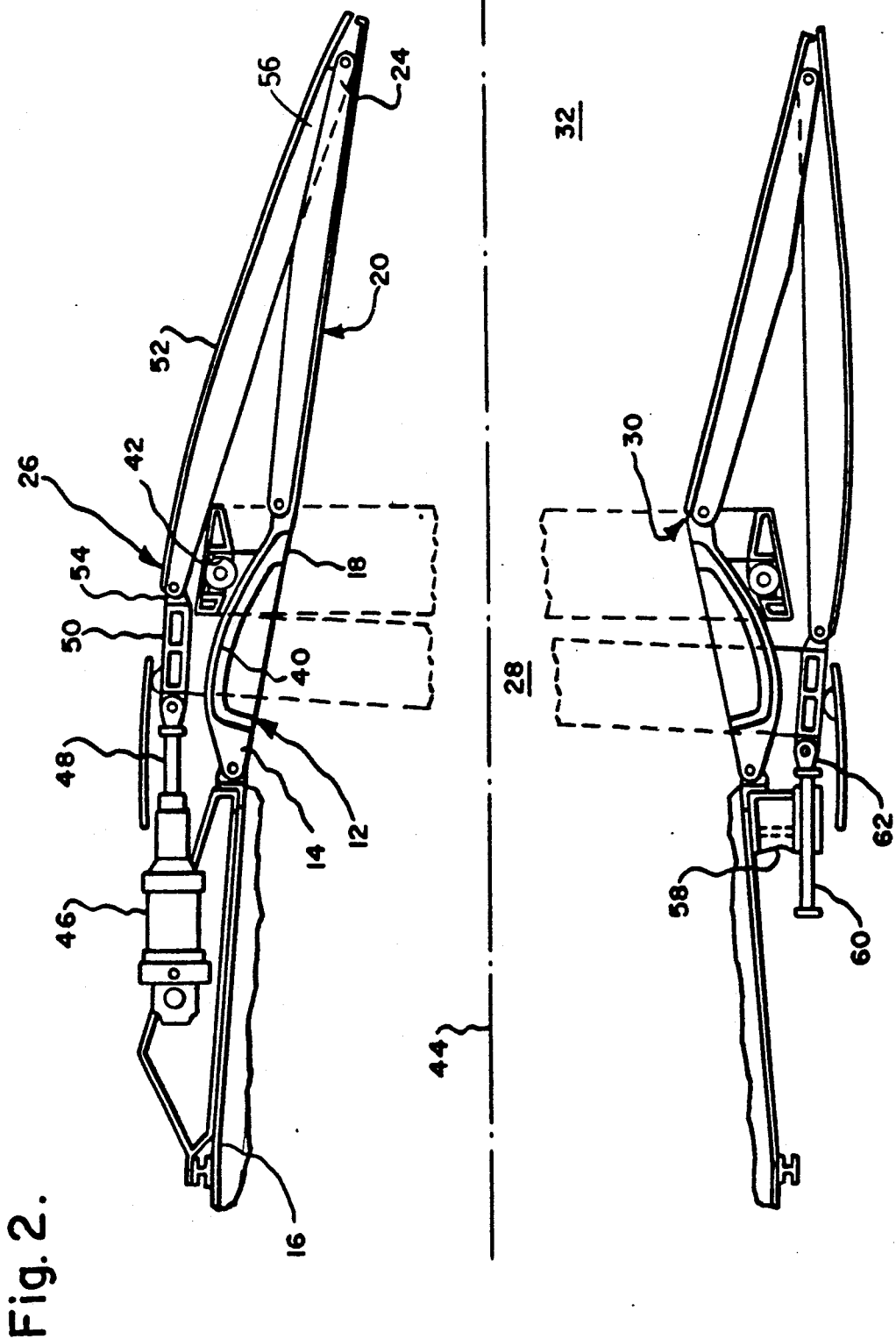
FIG. 2 is a transverse section of the exhaust nozzle illustrated in FIG. 1 taken along the line 2—2.
Figure 3:
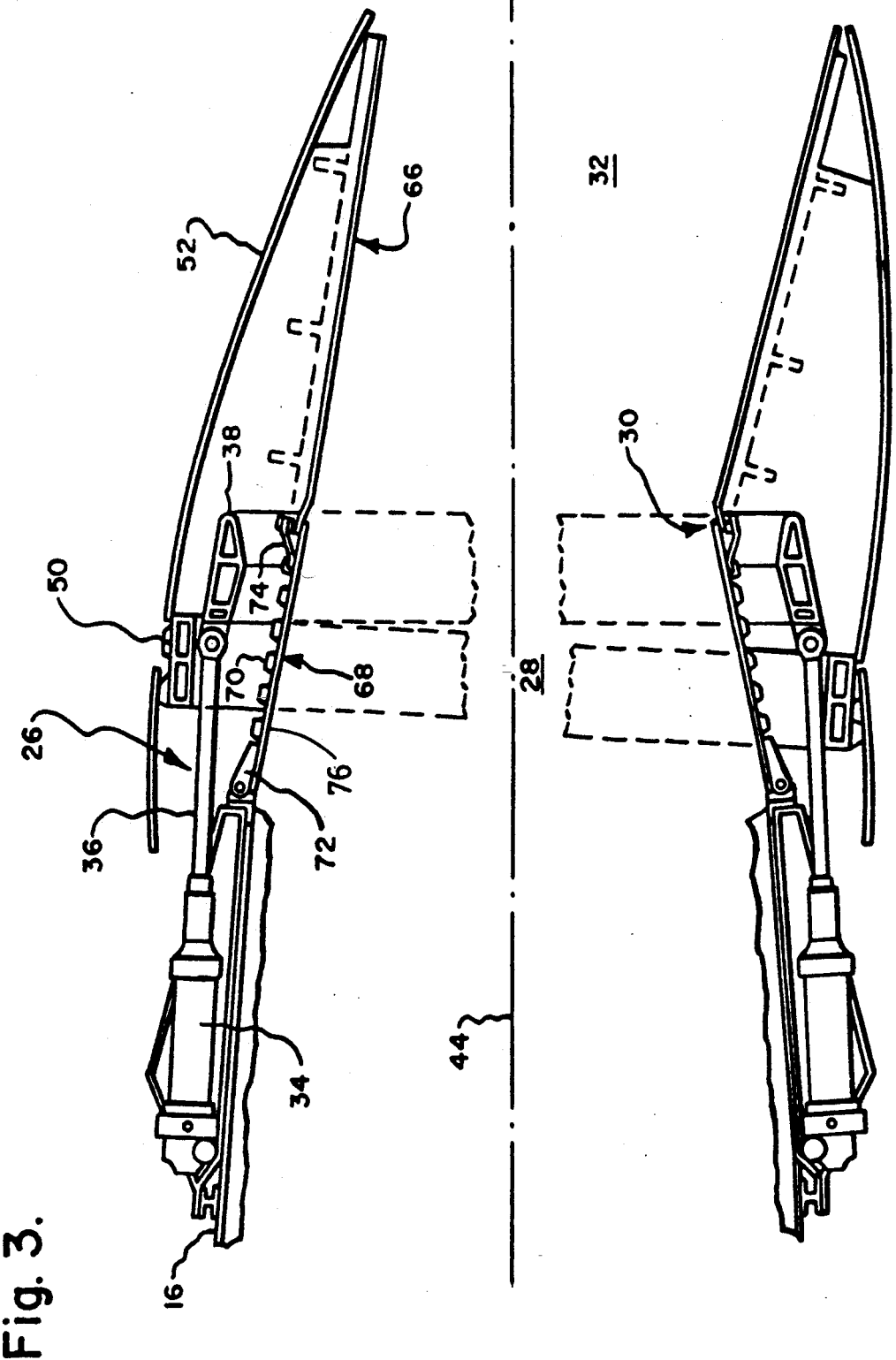
FIG. 3 is a transverse cross-section of the exhaust nozzle illustrated in FIG. 1 taken along line 3—3.

Illustrated in FIG. 1 is an exemplary, axisymmetric, vectorable, variable area exhaust nozzle 10 for an aircraft gas turbine engine. Referring to FIGS. 1-3, the nozzle 10 includes a plurality of circumferentially spaced primary exhaust flaps 12 each having an upstream end 14 suitably pivotally connected to an annular nozzle casing 16, and including a downstream end 18. The nozzle 10 also includes a plurality of circumferentially spaced secondary exhaust flaps 20, each having an upstream end 22 suitably orbitally connected to the primary flap downstream end 18, by a spherical joint for example, and also having a downstream end 24. The secondary flaps 20 extend downstream from the primary flaps 12.

Nozzle 10 also includes positioning means 26 for positioning the primary and secondary flaps 12 and 20 for controlling flow area defined thereby. The nozzle 10 is considered a converging-diverging nozzle since the primary flaps 12 are positionable for defining a converging channel 28 therebetween extending from the upstream ends 14 to the downstream ends 18. The junction of the primary flaps 12 and the secondary flaps 20 defines a throat 30 of minimum flow area. And, the secondary flaps 20 may be positioned for defining a diverging nozzle 32 extending from the upstream ends 22 and the throat 30 to the downstream ends 24.

The positioning means 26 includes a plurality of circumferentially spaced primary actuators 34, which may be hydraulic servovalves, each having an extendable primary rod 36 suitably connected to a primary ring 38 which surrounds the primary flaps 12. In a preferred embodiment four equiangularly circumferentially spaced primary actuators 34 are used. Disposed on the back side of each primary flap 12 is an arcuate cam surface 40 over which rolls a circular cam 42 suitably rotatably mounted in the primary ring 38. The primary rods 36 of the primary actuators 34 are positionable to move the ring 38 transversely relative to a longitudinal centerline axis 44 of the nozzle 10. When the ring 38 is disposed in a downstream position as illustrated more particularly in FIG. 2, the primary flaps 12 will form the throat 30 of relatively maximum flow area. When the ring 38 is disposed at an upstream position, the cams 42 will roll over the cam surfaces 40, and since the cam surfaces 40 are arcuate, the primary flaps 12 will be forced to move radially inwardly for obtaining the throat 30 with a relatively minimum flow area.

The positioning means 26 also includes a plurality of circumferentially spaced secondary actuators 46, which may be hydraulic servovalves, suitably connected to the casing 16, each including an extendable secondary rod 48 suitably connected to a secondary ring 50. In a preferred embodiment three equiangularly circumferentially spaced secondary actuators 46 are used. The secondary ring 50 is pivotally connected to a plurality of circumferentially spaced arms 52 at upstream ends 54 thereof. The arms 52 also includes downstream ends 56, each pivotally connected to the downstream end 24 of a respective secondary flap 20. Disposed approximately 180° from each secondary actuator 46 is a tubular sleeve 58 suitably connected to the casing 16 which includes an elongate support rod 60 which is slidable therein. The support rod 60 includes a downstream end 62 suitably pivotally connected to the secondary ring 50.

In the preferred embodiment, there are three equiangularly spaced secondary actuators 46 and, therefore, three respective support rods 60. In operation, the secondary flaps 12 are positioned by extending the secondary rods 48 which translate the secondary ring 50 parallel to the centerline axis 44 which rotates the arms 52 for rotating the secondary flaps 20 relative to the primary flap downstream ends 18. The secondary flaps 20 may be so positioned for either increasing or decreasing the flow area defined at the secondary flap downstream ends 24, which is conventionally known as $A_9$.

Figure 4:
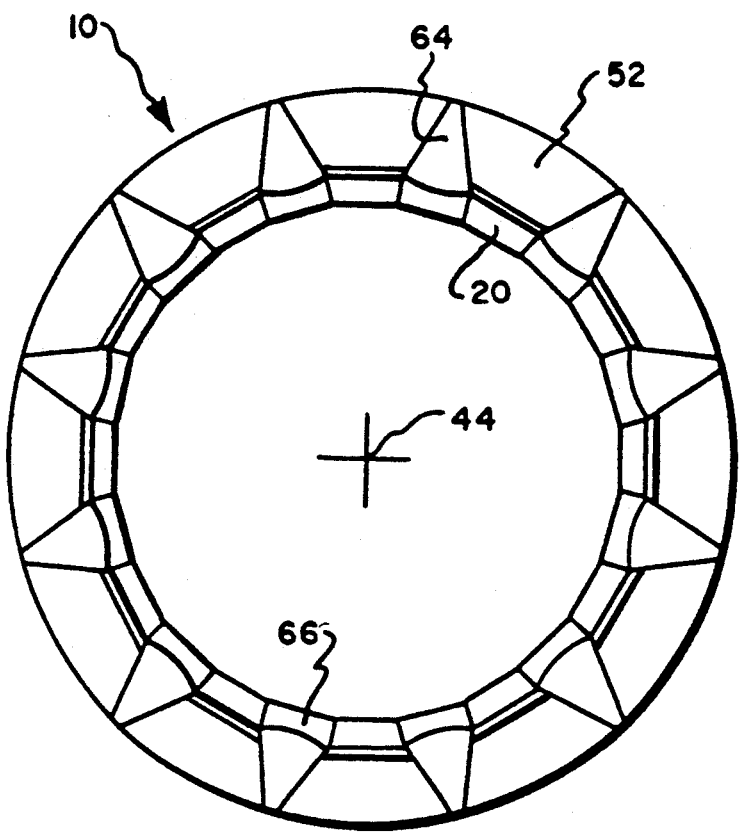
FIG. 4 is an end view of the exhaust nozzle illustrated in FIG. 1 disposed in an axisymmetric configuration, taken along line 4—4.

The secondary flap 20 may be positioned as above described axisymmetrically relative to the centerline axis 44. FIG. 4 illustrates an upstream facing view of exhaust nozzle 10 showing the axisymmetrically positioned secondary flaps 20.

Figure 5:
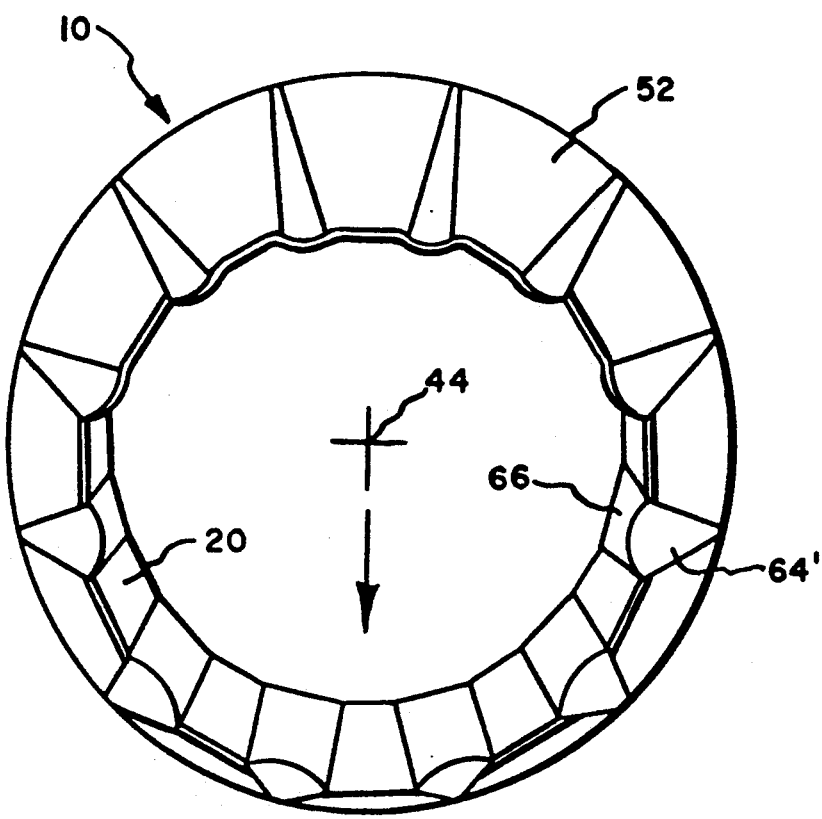
FIG. 5 is an end view of the exhaust nozzle illustrated in FIG. 1 disposed in a vectored position taken along line 4—4.

The secondary flaps 20 may also be positioned for vectoring exhaust gases from the exhaust nozzle 10. FIG. 5 illustrates an upstream facing view of exhaust nozzle 10 showing the secondary exhaust flaps 20 being positioned downwardly for vectoring exhaust gases for pitching exhaust nozzle 10, and the aircraft which is carrying the exhaust nozzle 10. FIG. 2 illustrates that the secondary actuator 46 at the top of exhaust nozzle 10 has been actuated for positioning the secondary rod 48 for tilting the secondary ring 50. In the preferred embodiment, three secondary actuators 46 are used and the other two secondary actuators 46 not illustrated in FIG. 2 are activated for extending their respective secondary rods 48 to a lesser extent than the extension of the secondary rod 48 of the top secondary actuator 46. By tilting the secondary ring 50, the secondary flaps 20 are corresponding positioned as illustrated in FIG. 2 for vectoring the exhaust gases in a downward direction.

Referring again to FIG. 4, a generally pie-shaped space 64 is illustrated between adjacent secondary flaps 20. This space 64 must be sealed for preventing exhaust gases from flowing between adjacent secondary flaps 20. For axisymmetric operation of the exhaust nozzle 10, as illustrated in FIG. 4, the secondary flaps 20 are identically rotated about respective primary flap downstream ends 24 and simply increase or decrease the circular flow area $A_9$ illustrated in FIG. 4. However, as illustrated in FIG. 5, when the secondary flaps 20 are positioned for vectoring exhaust gases, adjacent ones of the secondary flaps 20 are positioned askew from each other. Accordingly, the space between adjacent ones of the secondary flaps 20, designated 64′, is more complex since adjacent secondary flaps 22 no longer simply define a generally continuous circular circumference, but one which is generally stepwise discontinuous. In accordance with a preferred, exemplary embodiment of the present invention, a secondary exhaust nozzle flap seal 66 is provided for sealing the space 64 between adjacent secondary flaps 20.

A primary exhaust nozzle flap seal 68 is utilized for sealing the space between adjacent ones of the primary flaps 12. The primary flap seal 68 includes a ribbed backbone 70 having an upstream end 72 suitably pivotally connected to the casing 16 as illustrated in FIG. 1 and 3. The backbone 70 also includes a downstream end 74 being U-shaped. Fixedly connected to the backbone 70 is a generally rectangular primary seal plate 76 positioned for contacting adjacent ones of the primary flaps 12 for providing seals.

Figure 6:
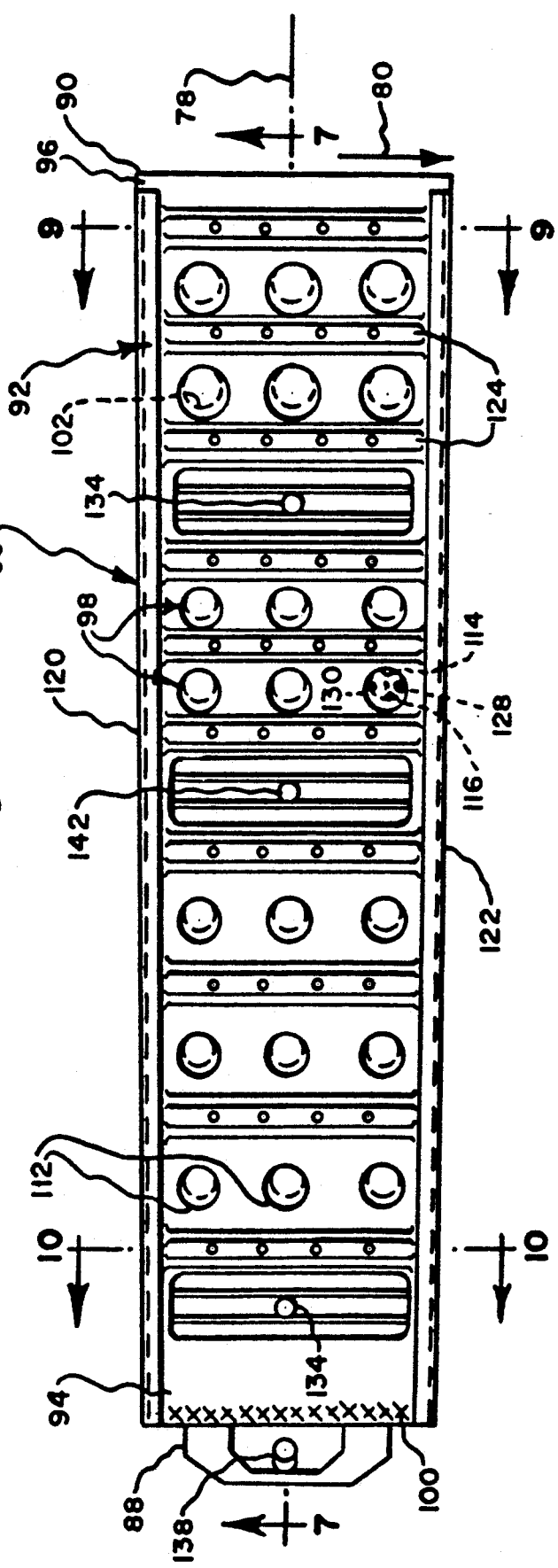
FIG. 6 is a plan, top view of one of the secondary exhaust nozzle flap seals of the nozzle illustrated in FIG. 1.
Figure 7:
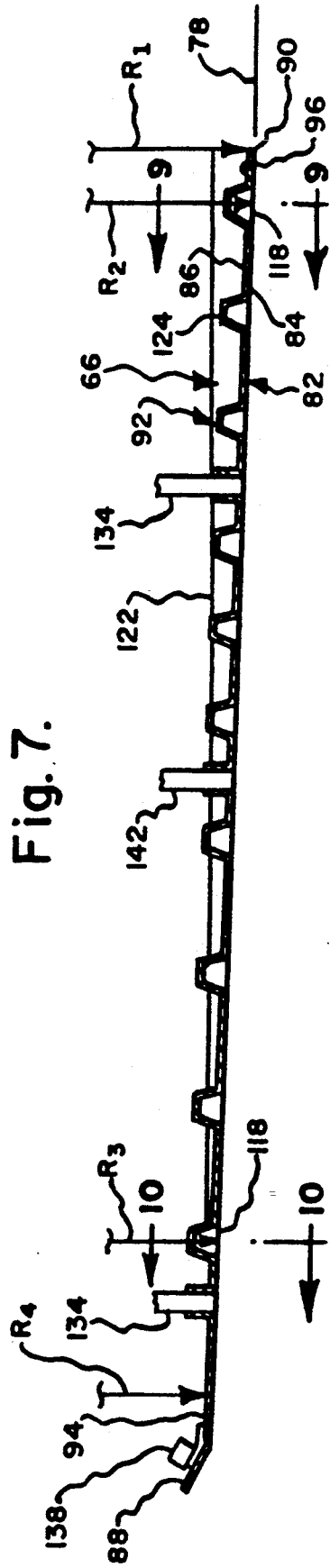
FIG. 7 is a longitudinal sectional view of the flap seal illustrated in FIG. 6 taken along the line 7—7.

The secondary exhaust nozzle flap seal 66 in accordance with a preferred, exemplary embodiment of the present invention is more particularly illustrated in FIGS. 6–10. Referring to FIGS. 6 and 7, the exhaust nozzle flap seal 66 includes a longitudinal, centerline axis 78 and a transverse axis 80 disposed perpendicularly thereto. The seal 66 further includes an elongate, flexible, relatively thin seal plate 82 aligned parallel to the centerline axis 78. The seal plate 82 includes an inner surface 84 for facing radially inwardly toward the exhaust nozzle longitudinal axis 44 and the combustion gases. The seal plate 82 also includes an outer surface 86 for facing radially outwardly toward the secondary flaps 20. The seal plate also includes a first, upstream end 88 and a second, downstream end 90.

The flap seal 66 further includes a support member 92 having a first, upstream end 94 disposed adjacent to the seal plate upstream end 88, and a second, downstream end 96 disposed adjacent to the seal plate downstream end 90. The support member 92 is elongate and extends generally coextensively with the seal plate 82 and parallel to the centerline axis 78 for supporting the seal plate 82.

The flap seal 66 further includes means 98 for joining the support member 92 to the seal plate 82, the joining means 98 being effective for fixedly joining the support member upstream end 94 to the seal plate upstream end 88 while allowing the seal plate downstream end 90 to slide relative to the support member 92 for accommodating differential thermal movement between the seal plate 82 and the support member 92.

The joining means 98 includes the support member upstream end 94 being fixedly joined to the seal plate upstream end 88, by spot welding, for example, as shown by a plurality of transversely spaced colinear spot welds 100. The joining means 98 further includes the support member 92 including a plurality of spaced support holes 102 as shown in FIG. 6, one of which holes 102 is more clearly illustrated in FIG. 8. The joining means 98 also includes a plurality of preferably circular, dimpled washers 104, one each of the washers 104 being disposed in a respective support hole 102. Each washer 104 includes a center region 106 fixedly joined to the outer surface 86 of the seal plate 82, for example by a spot weld 108. The washer 104 also includes an integral outer annulus 110 extending radially outwardly from the center region 106 and spaced parallel to the seal plate outer surface 86. Each of the washers 104 is larger than a respective one of the support holes 102 so that the support member 92 is disposed between the outer annulus 110 and the seal plate outer surface 86, and the outer annulus 110 slidingly engages the support member 92 for joining the support member 92 to the seal plate 82 while allowing sliding movement therebetween.

More specifically, and as illustrated in FIGS. 6 and 8, the holes 102 and washers 104 in the preferred embodiment are circular, with the holes 102 having a diameter $d_1$, the washers 104 having an outer diameter $d_2$, and the washer center region 106 being circular and having a diameter $d_3$. The washer center region 106 is smaller than the respective support hole 102 with $d_3$ being less than $d_1$. The washer outer annulus is larger than a respective one of the support holes 102 with the diameter $d_2$ being greater than $d_1$ to capture the support member 92 between the outer annulus 110 and the seal plate 82 to prevent relative movement of the support member 92 perpendicularly to the seal plate 72 while allowing relative sliding movement in longitudinal and transverse directions.

In the preferred embodiment, the flap seal 66 is disposed in the exhaust nozzle 10 with the seal longitudinal axis 78 aligned generally parallel with the nozzle longitudinal axis 44 as shown in FIG. 1. Similarly, it is preferred that the washers 104 and respective support holes 102 are aligned parallel to the seal longitudinal axis 78 and are arranged in a plurality of transversely spaced rows 112 parallel to the longitudinal axis 78 as shown in FIG. 6. For the particular embodiment illustrated, three rows 112 are utilized with each row including seven longitudinally spaced washers 104 and respective support holes 102 for providing a generally uniform perpendicular retention of the seal plate 82 to the support member 92.

As illustrated in FIGS. 6 and 8, each of the support holes 102 has a first, upstream side 114 and an opposing, second, downstream side 116. The upstream side 114 is disposed closer to the support member upstream end 94 than the downstream end 116 is disposed relative thereto. Each of the washer center regions 106 is initially positioned closely adjacent to, and may contact the upstream side 114 before the flap seal 66 is exposed to elevated temperatures of the combustor discharge exhaust gases channeled through exhaust nozzle 10.

Since the seal plate 82 is directly exposed to hot combustion gases in the exhaust nozzle 10, the seal plate 82 will heat, and thereby expand, faster than the support member 92. Accordingly, the washer center region 106 secured to the seal plate 82 will translate longitudinally downstream from the spot welds 100 which secure the seal plate 82 to the support member 92. The seal plate 82 is thus free to longitudinally expand relative to the support member 92 with a differential movement therebetween being accommodated by the space between the washer center regions 106 and the hole downstream side 116. The relative diameters $d_1$, $d_2$, and $d_3$ are preferably selected to ensure that adequate sliding movement of the washer center region 106 is available within the support hole 102 to accommodate expected amounts of differential movement. Since the outer annulus 110 is larger than the support hole 102, the support member 92 is retained against the seal plate 82 but the retention allows for longitudinal sliding movement therebetween.

The seal plate 82 in the preferred embodiment, has arcuate transverse cross-sections 118 from the seal plate downstream end 90 to the seal plate upstream end 94, and may be defined by a radius $R_1$, and radius $R_4$, respectively as illustrated in FIG. 7. FIGS. 9 and 10 illustrate two of the transverse cross-sections 118, a first transverse cross-section 118a disposed adjacent to seal plate downstream end 90 having a radius of curvature $R_2$, and a second transverse cross-section 118b disposed adjacent to the seal plate upstream end 88 having a radius of curvature $R_3$. The radius of curvature $R_1$ at the seal plate downstream end 90 has a value of about 5.5 inches (13.97 centimeters) and the radius of the transverse cross-sections 118 continuously increases from $R_1$ to $R_4$, with $R_4$ being substantially large with the transverse cross-section 118 associated with $R_4$ being generally, straight or flat.

A continuously changing arcuate cross-section 118 of the seal plate 82 is preferred for better accommodating the pie-shaped space between adjacent secondary flaps 52 as illustrated in FIG. 4.

Referring again to FIGS. 6-9, the seal plate 82 includes a first seal edge 120 and an opposite, second seal edge 122 disposed generally parallel to the longitudinal centerline axis 78 for contacting adjacent secondary flaps 20 in exhaust nozzle 10 for providing seals therewith. The first and second seal edges 120 and 122 are defined by convex ends of the transverse cross-sections 118 of the flap seal 66 and in the preferred embodiment, are portions of the support member 92.

The support member 92 preferably comprises a relatively thin plate having a plurality of longitudinally spaced stiffening ribs 124. The ribs have a generally U-shaped cross-section and may be formed by a simple stamping of the support member plate 92 for creating corrugations which define the ribs 124. The ribs 124 are disposed generally parallel to the transverse axis 80 and longitudinally spaced from each other. In the preferred embodiment, the washers 104 and respective support holes 102 are disposed between adjacent ribs 124 in a planar valley section 126 defined therebetween. Since the support member 92 is relatively thin, it is also relatively flexible. However, the ribs 124 provide preferential structural rigidity in the support member 92.

More specifically, the ribs 124 are disposed parallel to the transverse direction 80 and thus when the flap seal 66 is disposed in exhaust nozzle 10 with the first and second seal edges 120 and 122 contacting adjacent secondary flaps 20, the ribs 124 provide radial rigidity for accommodating radial exhaust gas forces acting over the seal plate inner surface 84. However, the ribs 124 are longitudinally spaced from each other, and therefore the valley sections 126 are not structurally rigid. This allows the flap seal 66 to twist relative to the longitudinal axis 78 to accommodate the skewing of adjacent secondary flaps 52 as illustrated, for example, in FIG. 5.

Accordingly, the flap seals 66, including the support member 92 and the seal plate 82, are allowed to twist relative to the longitudinal centerline axis 78 while being rigid in transverse planes extending through each of the ribs 124. Furthermore, since the support holes 102 are larger than the washer center regions 106, and since the washer center region is initially positioned adjacent to the hole downstream side 116 and, equidistantly spaced from transverse, opposing third and fourth sides 128 and 130 of the holes 104 as illustrated in FIG. 6, twisting of the seal plate 82 may be accommodated. Not only can the washer center region 106 slide freely parallel to the longitudinal axis 78, but it may also slide freely in either direction parallel to the transverse axis 80 for accommodating twisting of the flap seal 66.

Both the seal plate 82 and the support member 92 are preferably thin so that they may be conventionally fabricated by stamping. In an exemplary embodiment, the plate 82 and member 92 are 0.020 inches thick and are formed of conventional exhaust flap material such as Rene 41.

Each of the flap seals 66 is disposed in exhaust nozzle 10 as illustrated in FIG. 1 by a pair of conventional T-shaped retaining members 132. The retaining member 132 includes a base 134 suitably fixedly connected to the support member 92, and a pair of T-member ends 136 which slidely contact outer surfaces of the secondary flaps 20 for retaining the first and second seal edges 120 and 122 against the inner surface of the secondary flaps 20. The flap seal 66 also includes a retention pin 138 at the upstream end of the seal plate 82 which is positioned in the U-shaped downstream end 74 of the primary flap seal 68. A conventional centering linkage 140 includes a base 142 suitably fixedly secured to the support member 92. The linkage 140 is suitably connected to adjacent secondary flaps 20 for maintaining the flap seal 66 in a centered position during movement of the secondary flaps 20.

Adjacent to the downstream end 96 of the support member 92 as illustrated in FIGS. 1 and 9, the rib 124 of transverse section 118a is disposed below the adjacent first and second seal edges 120 and 122 to prevent the rib 124 from interfering with the adjacent secondary flaps 20. Adjacent to the upstream end 94 of the support member 92, the ribs 124 of the transverse section 118b are generally arcuate and outwardly convex as illustrated in FIGS. 10 and 1 and blend with the first and second seal edges 120 and 122 for preventing interference of the rib 124 with the adjacent secondary flaps 20.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

More specifically, and for example only, although the secondary flap seal 66 in accordance with the invention has particular utility in a vectorable, axisymmetric variable area nozzle, it may also be used in a non-vectorable nozzle, or other nozzles requiring similar seal edges 120 and 122 for accommodating differential thermal movement. Although the seal edges 120 and 122 are formed as sections of the support plate 92 they also may be formed as sections of the seal plate 82 where the support member 92 does not overlap the seal plate 82. Although a preferred embodiment of U-shaped stiffening ribs 124 has been disclosed, other types of stiffening ribs may also be used. Furthermore, the primary flap seal 68 may be constructed in accordance with the preferred embodiment of the secondary flap seal 66, even though the primary flaps 12 are not vectorable and do not twist.

Accordingly, what is desired to be secured by Letters Patent of the United States is the invention as defined and differentiated in the following claims:

1. A seal for a gas turbine engine exhaust nozzle comprising:
   a seal plate having a first end and a second, opposite end, and having a plurality of washers, each of said washers having a center region fixedly joined to said seal plate and an outer annulus spaced from said seal plate;
   a support member having a first end and extending generally coextensive with said seal plate for supporting said seal plate, said support member including a plurality of spaced support holes;
   said support member first end fixedly joined to said seal plate first end; and
   each of said washers being larger than a respective one of said support holes and disposed therein so that said support member is disposed between said outer annulus and said seal plate, and said outer annulus slidingly engages said support member for joining said support member to said seal plate while allowing sliding movement therebetween accommodating differential thermal movement between said seal plate and said support member.

2. A seal according to claim 1 wherein said seal has a longitudinal centerline axis and said washers and said respective support holes are aligned parallel to said longitudinal centerline axis.

3. A seal according to claim 1 wherein said seal has a longitudinal centerline axis and a transverse axis disposed perpendicularly thereto and said washers and said respective support holes are arranged in a plurality of transversely spaced rows parallel to said longitudinal centerline axis.

4. A seal according to claim 1 wherein said washers and support holes are circular.

5. A seal according to claim 1 wherein each of said support holes has a first side and an opposing second side, said first side being disposed closer to said support member first end, and wherein each of said washer center regions is smaller than a respective support hole and is initially positioned closely adjacent to said second side thereof before said seal is exposed to elevated temperature.

6. A seal according to claim 1 wherein said seal plate includes a longitudinal centerline axis and a transverse axis disposed perpendicularly thereto, and a first seal edge and an opposite, second seal edge disposed generally parallel to said longitudinal centerline axis for contacting adjacent members in said exhaust nozzle for providing seals therewith.

7. A seal according to claim 6 wherein said seal plate has arcuate transverse cross-sections and said first and second edges define respective ends of said support member attached to said seal plate.

8. A seal according to claim 7 wherein said transverse cross-sections change in radius from said seal plate first end to said seal plate second end.

9. A seal according to claim 8 wherein said transverse cross-section is substantially straight at said seal plate second end.

10. A seal according to claim 7 wherein said first and second seal edges are defined by convex ends of said support member.

11. A seal according to claim 1 wherein said support member comprises a plate having a plurality of spaced stiffening ribs.

12. A seal according to claim 11 wherein said support holes are disposed between said ribs.

13. A seal according to claim 11 wherein said seal has a longitudinal centerline axis and a transverse axis disposed perpendicularly thereto and said ribs are disposed parallel to said transverse axis and spaced longitudinally from each other.

14. A seal according to claim 13 wherein said support holes are disposed between said ribs.

15. A seal according to claim 14 wherein said washers and said respective support holes are arranged in a plurality of transversely spaced rows parallel to said longitudinal centerline axis.

16. A seal according to claim 15 further including three transversely spaced ones of said rows, each row including seven of said washers and respective support holes.

17. A seal according to claim 15 wherein said support member plate is flexible and said stiffening ribs are longitudinally spaced to allow said support plate and seal plate to twist relative to said longitudinal centerline axis while being rigid in transverse planes extending through each of said ribs.

18. A seal according to claim 17 wherein each of said support holes has a first side and an opposing second side, said first side being disposed closer to said support member first end and wherein each of said washer center regions is smaller than a respective support hole and is initially positioned closely adjacent to said second side thereof before said seal is exposed to elevated temperature for allowing said seal plate to thermally expand from said seal plate first end relative to said support member and to twist about said longitudinal centerline axis.

19. A variable area exhaust nozzle comprising:
   a plurality of circumferentially spaced primary exhaust flaps;
   a plurality of circumferentially spaced secondary exhaust flaps extending downstream from said primary flaps;
   means for positioning said primary and second flaps for controlling flow area defined thereby;
   a plurality of seals, each of said seals having a longitudinal centerline axis with first and second edges parallel thereto and a transverse axis disposed perpendicularly thereto, disposed between adjacent ones of said secondary exhaust flaps with said first and second seal edges disposed in sealing contact with said adjacent secondary exhaust flaps, each of said seals further including:
   a seal plate having a first end and a second, opposite end, and having a plurality of washers, each having a center region fixedly joined to said seal plate and each having an outer annulus spaced from said seal plate;
   a support member having a first end fixedly joined to said seal plate first end and extending generally coextensive with said seal plate for supporting said seal plate, said support member including a flexible plate having a plurality of longitudinally spaced spaced stiffening ribs, said ribs disposed parallel to said transverse axis, and a plurality of spaced support holes disposed between said stiffening ribs, wherein each of said support holes has a first side and an opposing second side, said first side being disposed closer to said support member first end;
   wherein each of said washers being larger than a respective one of said support holes, and each of said washer center regions is smaller than a respective support hole, and is disposed therein so that said support member is disposed between said outer annulus and said seal plate, said outer annulus slidingly engages said support member for joining said support member to said seal plate while allowing sliding movement therebetween, accommodating differential thermal movement between said seal plate and said support member;
   wherein said washers and said respective support holes are arranged in a plurality of transversely spaced rows parallel to said longitudinal centerline axis;
   wherein said spacing of said longitudinally spaced stiffening ribs along said flexible support plate is such as to allow said support plate and seal plate to twist relative to said longitudinal centerline axis while being rigid in transverse planes extending through each of said ribs; and
   wherein each of said washer center regions is initially positioned closely adjacent to said second side of said support hole before said seal is exposed to elevated temperature for allowing said seal plate to thermally expand from said seal plate first end relative to said support member and to twist about said longitudinal centerline axis.

20. An exhaust nozzle according to claim 19 wherein said secondary exhaust flaps are vectorable and said seals are twistable when said secondary exhaust flaps are vectored for maintaining sealing contact between said first and second seal edges and said adjacent secondary exhaust flaps.

* * * * *